United States Patent [19]
Feldmann et al.

[11] Patent Number: 5,189,391
[45] Date of Patent: Feb. 23, 1993

[54] METHOD FOR THE SURVEILLANCE OF A BRAKE DEVICE IN REGARD TO OVERLOAD

[75] Inventors: Joachim Feldmann, Neustadt; Erwin Petersen, Wunstorf; Manfred Schult, Garbsen, all of Fed. Rep. of Germany

[73] Assignee: WABCO Westinghouse Fahrzeugbremsen GmbH, Hanover, Fed. Rep. of Germany

[21] Appl. No.: 581,527

[22] Filed: Sep. 12, 1990

[30] Foreign Application Priority Data

Sep. 13, 1989 [DE] Fed. Rep. of Germany ....... 3930571

[51] Int. Cl.⁵ ........................................... G01M 19/00
[52] U.S. Cl. ..................................... 340/453; 73/129
[58] Field of Search ............... 340/453, 459, 449, 452; 73/129; 188/1.11

[56] References Cited

U.S. PATENT DOCUMENTS

| | | | |
|---|---|---|---|
| 4,074,226 | 2/1978 | Takeda et al. | 340/452 |
| 4,771,387 | 9/1988 | Hexel et al. | 340/453 X |
| 4,937,554 | 6/1990 | Herman | 340/453 |

FOREIGN PATENT DOCUMENTS

| | | |
|---|---|---|
| 0189083 | 7/1986 | European Pat. Off. . |
| 0320602 | 6/1989 | European Pat. Off. . |
| 1260313 | 2/1968 | Fed. Rep. of Germany . |
| 2144466 | 3/1972 | Fed. Rep. of Germany . |
| 2106411 | 8/1972 | Fed. Rep. of Germany . |
| 233715 | 4/1988 | Japan . |
| 8200219 | 2/1984 | World Int. Prop. O. . |

OTHER PUBLICATIONS

International Patent Application WO-84/00406. Feb. 1984.

*Primary Examiner*—Jin F. Ng
*Assistant Examiner*—Brian R. Tumm
*Attorney, Agent, or Firm*—Horst M. Kasper

[57] ABSTRACT

A method for the surveillance of a brake device includes an indirect measurement of temperature of a selected device component, for example a brake drum, of a brake device. A warning signal is furnished, if this measured temperature reaches a maximum permissible value. The invention method is quick by employing the pressure-dependent deformation characterizing curve (11) of the device component heated to the permissible temperature. The device component represented by the brake drum (1) can heat to the maximum permissible temperature and is placed under surveillance during a brake actuation based on deformation and pressure measurement. It is then determined if the actual values reach or exceed the deformation characterizing curve (11). The invention apparatus is used in connection with brake devices in vehicles.

15 Claims, 1 Drawing Sheet

METHOD FOR THE SURVEILLANCE OF A BRAKE DEVICE IN REGARD TO OVERLOAD

BACKGROUND OF THE INVENTION

1. Field of the Invention

The invention relates to a method for the surveillance of a brake device in relation to overload, where the brake device includes a wear readjustment device, is actuatable by pressure, and reaches its load limit in a brake actuation after warming of a selected device component to a permissible temperature, where the thus selected device component follows a pressure-dependent characterizing curve of a value representing the deformation.

2. Brief description of the Background of the Invention Including Prior Art

Such a method is known from the International Patent Application WO-84/00406. This method provides for the surveillance of a brake device of the above-indicated kind relative to overload by measuring the temperature of the selected device component and by furnishing a warning signal if this temperature reaches the maximum permissible value. The method employs temperature sensors for measuring the temperature at or in the neighborhood of the selected device component. The device component can be a brake drum or a brake disk.

The inertia of the temperature surveillance is a disadvantage in the context of this method. The selected device component can already have surpassed the permissible temperature, the brake device can thus already be overloaded before a warning signal is furnished in view of the mentioned inertia.

The German printed Patent Publication DE-OS 2,144,466 to H. Negendank et al. teaches a display apparatus for indicating the state of a brake friction lining of a vehicle. A temperature-sensitive element 40 forms part of an electric circuit 52, 28. This electric circuit can be connected to a display apparatus 50, 56 located remotely from the brake. The element 40 induces the display apparatus for providing a signal in cases where the temperature of the brake lining 14 reaches a predetermined value. While this reference employs a temperature-sensitive element, it appears, however, that a reliable overall determination of a possibly existing temperature overloading of a device, having substantial spatial extension, is not ensured with the reference device.

The German Printed Publication Document DE-AS 1,260,313 to Walter Schwengler teaches a measurement device for measuring the radius of curvature of hot water boiler pumps. It is an object of the reference to determine the curvature state of circular pumps transporting hot media. No suggestion is made in the reference in connection with a safety system for vehicular brake systems. The German Printed Patent Document laid open DE-OS 2,106,411 to Andreas Pitter teaches a pulse generator for a load torque limiting device of a crane, hoist or the like. It appears that this reference is not concerned with temperature induced changes of brake systems.

The Japanese document 62-233715 (A) to Yoichi Nagayama teaches an inclination detecting device for a wheel hub. While the reference is concerned with the wheel of a motor vehicle, it does not address the brake system.

SUMMARY OF THE INVENTION

1. Purposes of the Invention

It is an object of the present invention to improve the conventional method such that the surveillance of the brake device versus overloading occurs substantially without disturbances.

It is a further object of the invention to provide a method which is simple but will indicate temperature values beyond limiting values.

These and other objects and advantages of the present invention will become evident from the description which follows.

2. Brief Description of the Invention

The present invention provides a monitoring system for a brake device relating to overload conditions. The brake device is actuated with a pressure p. A device component is warmed up to a permissible temperature T and deformed while the brake device reaches a load limit. A pressure-dependent characterizing curve of a value representing the deformation of the device component after warming is determined and this curve is designated in the following as deformation characterizing curve $h = f_{(p,T)}$. The value h is evaluated in a brake actuation and represents the deformation occuring of the selected device component based on measuring of the value $h_{ist}$ and of the existing pressure $p_{ist}$. A warning signal is furnished if the point defined by the value $h_{ist}$ and the pressure $p_{ist}$ reaches the deformation characterizing curve $h = f_{(p,T)}$ or exceeds the deformation characterizing curve $h = f_{(p,T)}$ in a direction of higher values of the value h.

The brake device can comprise a drum brake, and the selected device component can preferably be the brake drum.

According to a further aspect, the apparatus for monitoring a pressure actuated device component includes a deformation sensor furnished for capturing the value $h_{ist}$ and for transforming the captured value into an electrical deformation signal. A pressure sensor is furnished for capturing the existing pressure $p_{ist}$ and for transforming the captured value into an electrical pressure signal. An evaluation electronics connected to the deformation sensor and connected to the pressure sensor and furnished for receiving the deformation signal from the deformation sensor and the pressure signal from the pressure sensor. The evaluation electronics includes a memory storage and wherein the pressure-dependent deformation characterizing curve (11) $h = f_{(p,T)}$ is stored in the memory storage. The evaluation electronics is arranged for comparing the value $h_{ist}$ with the value $h_{(pist,T)}$ of the deformation characterizing curve $h = f_{(p,T)}$ coordinated to the existing pressure $p_{ist}$. The evaluation electronics furnishes a warning signal if the value $h_{ist}$ is equal to or larger than the value $h_{(pist,T)}$.

A time member can be structured such that it furnishes a measurement signal during a brake actuation at one or several predetermined points in time after the start of the brake actuation. The measurement signal is received by the evaluation electronics and the evaluation electronics becomes activated by this measurement signal. An indicating device for a driver of a motor vehicle can be connected to the evaluation circuit for warning the driver in appropriate situations.

The invention employs the knowledge that there exists a connection between the pressure, which is fed into the brake device, the thereby occurring deformation of a selected device component, and the temperature of the selected device component.

The invention can be performed with device components which do not have to be subjected to the temperatures prevailing in the brake device. The invention therefore can be performed with a particularly low number of interferences and disturbances.

The invention requires a particularly small special expenditure, if one or several of the device elements required for its performance are already present based on other reasons, such as, for example, a pressure sensor in a certain kind of electrical brake-pressure control and/or a sensor for sensing the stroke rotation angle for surveillance of the readjustment device relating to wear, which can be employed as a deformation sensor.

If the brake device comprises a drum brake, then the brake drum is preferably to be considered the selected device component. If the brake device comprises a disk brake, then the preferably selected device component in case of a partial disk brake is the brake caliper, and in case of a full disk brake, the brake casing assuming the function of the brake disk.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENT

Figure 1:
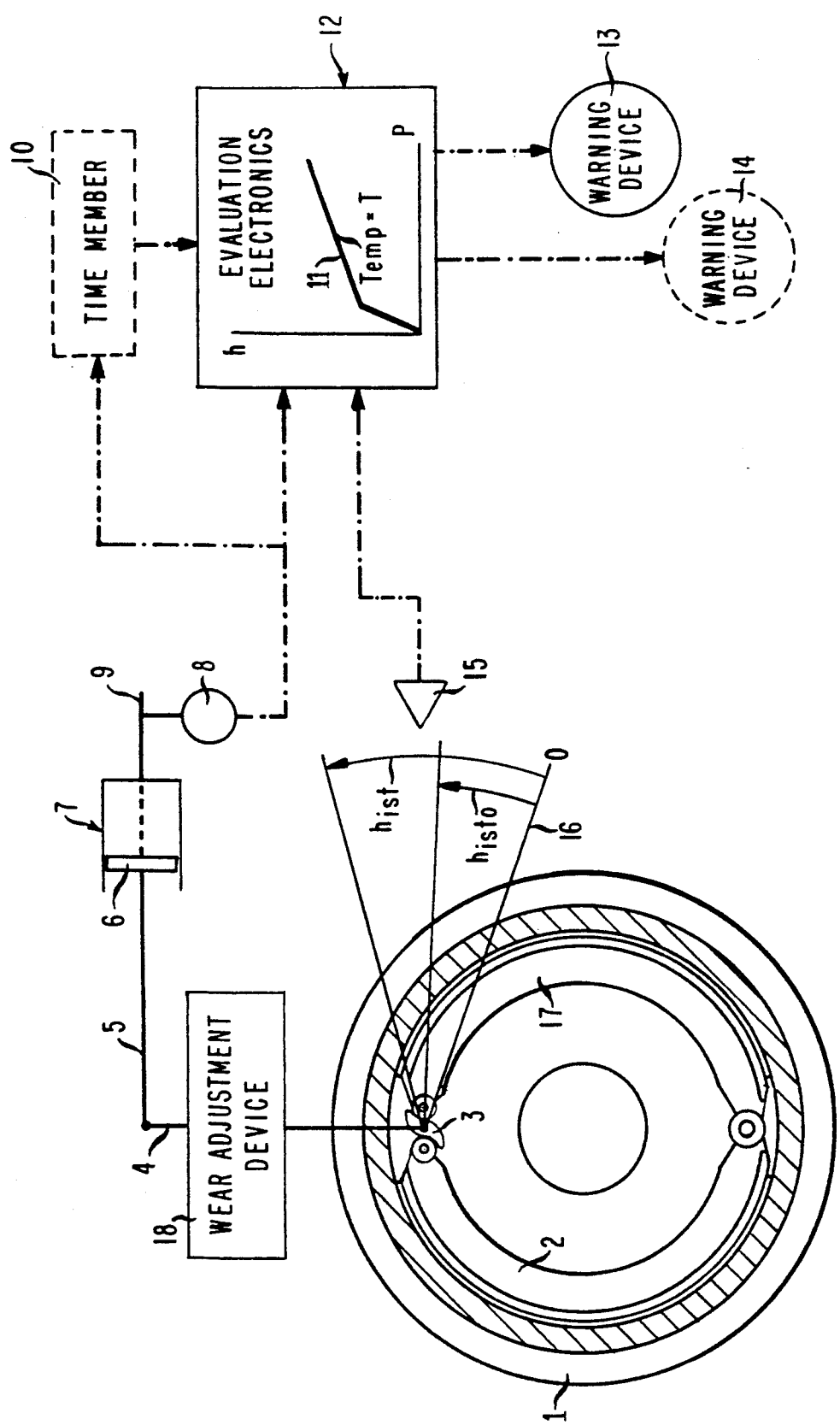
FIG. 1 illustrates a schematic diagram of the invention device for determining loads on a brake device.

FIG. 1 shows mechanical connection lines as full lines and electrical connection lines by dash-dotted lines.

The brake device comprises a drum brake including a brake drum 1 and brake shoes 2, 17, as well as an actuating device 3, 4, 5, 7, as illustrated in FIG. 1. The actuation device comprises a brake cylinder 7 with a piston member 6, which can be formed as a piston with annular seal(s) or as a membrane piston, a brake cam 3, and a transfer device 4, 5, connecting the piston member 6 to the brake cam 3. The transfer device 4, 5 is of a conventional construction and comprises a wear readjustment device 18 not illustrated in detail.

Such a brake device is known. It appears appropriate to include within the description of the present invention newly encountered aspects of the operating behavior within the recitation of conventional aspects.

In case of an unactuated brake device, i.e. in a pressure-free state of the brake device, the diameter of the brake drum depends on the temperature of the brake drum 1 and on a mechanical base load possibly resulting from assembly and mounting. The temperature of the brake drum depends, in addition to the ambient temperature, also on a heating during brake actuation or upon preceding brake actuation.

If the brake device is actuated by feeding of a pressure to the brake cylinder 7 via a pressure line 9, then the brake drum 1 is mechanically loaded after overcoming of a response resistance by the press-on force of the brake shoes 2, 17 and becomes correspondingly elastically deformed. Simultaneously, the brake drum 1 is heated by the effected brake friction transforming kinetic energy into heat and is thus additionally thermally deformed. The diameter of the brake drum changes (enlarges) accordingly.

Thus, depending on the temperature of the brake drum, the brake drum can be deformed to a different extent in case of one certain defined pressure value, and consequently the brake drum diameter can be different even though the pressure remains constant. In case of a given pressure, there exists therefore a connection between the brake-drum diameter and the temperature of the brake drum 1. On the other hand, the temperature of the brake drum 1 characterizes the load state of the brake device. If the temperature of the brake drum reaches a permissible value, designated in the following as permissible temperature T, then, based on "fadings", the functioning of the brake device is endangered and the load limit of the brake device has been reached. For these reasons and because of relatively simple capturing of its deformation, described hereinafter in more detail, the brake drum 1 has been selected as the device component used for the surveillance of the brake device relative to overload.

The deformation of the brake drum 1 in the form of the change of its diameter entails a change of the travel of components of the actuation device participating in the brake actuation.

These travels can therefore, in case of an effective wear readjustment device, be evaluated as values representing the deformation of the device component, represented by the brake drum 1. The rotation angle of the brake cam 3 is employed as a value in the following.

The piston member 6 and with it the transfer device 4, 5, as well as the brake cam 3 and the brake shoes 2, 17, are subjected to the force of a restoring means, not illustrated, for obtaining a restored initial setting during the unactuated state of the brake device. An arbitrary beam 16 through the rotation axis of the brake cam 3 is to define the coordinated angular rotation angle zero (0) of the brake cam 3. In this state, the brake shoes 2, 17 exhibit release gap versus the brake drum 1.

Since in the present case, the readjustment device balances an increase of the release gap based on the wear of the brake lining, this readjustment depends only on the temperature-dependent deformation of the brake drum 1 in addition to the base setting.

Upon actuation of the brake device, the release gap is initially overcome against the initial resistance, which includes among other things the force of the reset means, by rotation of the brake cam 3 around an initial rotation angle $h_{isto}$ and thereby the brake shoes 2, 17 are resting directly at the brake drum 1. The initial rotation angle $h_{isto}$ represents thus the size of the release gap present. The pressure coordinated to the initial rotation angle $h_{isto}$ is the response pressure $p_{isto}$.

During the following rise of the pressure in the brake cylinder 7 to the value $p_{ist}$ desired by the driver as a brake pressure, the brake drum 1 experiences the already recited simultaneous elastic and additional thermal deformation with a corresponding change of its diameter. This deformation is associated with an increase of the rotation angle of the brake cam 3 to a value $h_{ist}$. The rotation angle $h_{ist}$ remains in the course of a brake actuation only the same, if the brake drum 1 has reached a continuous temperature value. Otherwise, the rotation angle $h_{ist}$ changes in the course of a brake actuation because the brake drum diameter becomes larger with increasing temperature.

The arrangement schematically represented in FIG. 1 for performing of a method for the surveillance of the brake device relative to overload is designated in the base embodiment with 8, 12, 15. It consists in the base embodiment of a deformation sensor 15, a pressure sensor 8, and an evaluation electronics 12.

The deformation sensor 15 captures the rotation angle $h_{ist}$ of the brake cam 3 and transforms this rotation angle $h_{ist}$ into an electric deformation signal. The pressure sensor 8 captures the pressure $p_{ist}$ in the brake cylinder 7 and transforms this pressure $p_{ist}$ into an electrical pressure signal.

Transformed to electrical values, the characterizing curve measured versus pressure P of the rotation angle h of the brake drum 1, heated to the permissible temperature T, hereinafter designated deformation characterizing curve 11 $h = f_{(p,T)}$ is stored in the evaluation electronics 12. The deformation characterizing curve 11 defines two regions in the h/p coordinate field. In the region disposed below the deformation characterizing line 11 in the figure, the temperature of the brake drum 1 is disposed below the permissible temperature T. In the region disposed above the deformation characterizing line 11, the temperature of the brake drum 1 is disposed above the permissible temperature T. The brake drum 1 exhibits just the permissible temperature T on the deformation characterizing curve 11.

The determination of the deformation characterizing curve 11 and the therefore required warming of the brake drum 1 occur in general under the incorporation and operation conditions of the brake device as actually used. However, it is also possible to perform these steps in a test station.

The evaluation electronics 12 is connected on its input side with the outputs of the deformation sensor 15 and of the pressure sensor 8.

The evaluation electronics 12 is formed such that it furnishes a warning signal after comparing the respectively captured rotation angle $h_{ist}$ with the value $h(p_{ist},T)$ of the deformation characterizing curve 11 coordinated to the actual pressure value $p_{ist}$. The warning signal is given if the value $h_{ist}$ is equal to or larger than the value of the deformation characterizing curve 11. In other words, this structure of the evaluation electronics 12 can be described such that it provides a warning signal if the point of the h/p coordinate field, determined by the rotation angle $h_{ist}$ and the pressure $p_{ist}$, reaches the deformation characterizing curve 11 or surpasses the deformation characterizing curve 11 in the direction of higher values of the rotation angle h. Since the deformation characterizing curve 11 corresponds to the permissible temperature T of the brake drum 1, and since this temperature T is exceeded in case of higher values of $h_{ist}$, the warning signal thus characterizes the reaching or also the exceeding of the permissible temperature T of the brake drum 1.

A device is indicated with reference numeral 14, which transforms the warning signal into a form which can be received and noted by the driver.

The device 8, 12, 15 operates continuously in the described base construction and this means that the evaluation electronics 12 continuously performs the above-recited comparison.

The base construction can be further developed by employing a time member 10, indicated in the drawing with dashed lines, such that is operates only during a brake actuation.

The time member 10 is structured such that, during a brake actuation, there is furnished a measurement signal at one or several predetermined points in time after the start of the brake actuation. The evaluation electronics 12 is structured in this further development such that it receives the measurement signal and is activated by this measurement signal. Thus it performs its above-described function only after receiving of a measurement signal. The evaluation electronics 12 can furthermore be furnished with a holding function, which assures the maintenance of the warning signal after a drop of the measurement signal.

The start and the end of the brake actuation can be signalled in any desired way to the time member 10, for example by a signal generator at a brake-value generator actuated by the driver. In the present case, the time member 10 evaluates as the start and the end of the brake actuation the passage of the pressure in the brake cylinder 7 through the value of the response pressure $p_{isto}$. The time member 10 is connected for this purpose to the output of the pressure sensor 8.

The arrangement 8, 12, 15 or, respectively, 8, 10, 12, 15 allows also a control of the wear readjustment device. If the wear readjustment device does not readjust, then the deformation sensor 15 captures during a brake actuation an unusually large initial rotation angle $h_{isto}$, which angle can be transformed, by way of a suitable device or by a corresponding formation of the evaluation electronics 12 into an indication for the driver with respect to a functional interference of the wear readjustment device. The evaluation electronics 12 could be formed in this context for example such that, upon receipt of a pressure signal, corresponding to the response pressure $p_{isto}$, it performs a reasonability test of the deformation signal, for example a comparison with a stored limiting value, and that the evaluation electronics 12 furnishes a warning signal upon determination of a unreasonableness of the observed values. In a further development, the evaluation electronics 12 can be controlled by the time member 10 for making this reasonability test. A device 14, illustrated with dashed lines, indicates this embodiment, which transforms this warning signal into a shape and form which can be received and noted by the driver.

The stroke of the piston member 6 can, for example, also be employed as a travel representing the deformation of the brake drum 1. However, the primarily elastic deformation of the transfer device 4, 5 would be represented into this stroke. It is apparent that the capturing of the deformation by way of the rotation angle h of the brake cam 3, employed in this embodiment, is simpler compared to this possibility.

The brake drum 1 was selected as the device component for determining the load state of the brake device based on the reasons recited above. The realized technical disclosure relating to the embodiment can be transferred in a corresponding application to other device components of a brake device with brake drum or with a completely different structure of the brake device. In particular, a brake device with a disk brake is to be considered in this context. The stroke of a piston member could be the value in connection with a disk brake, which would be the preferred value representing the deformation of the selected device component.

It will be understood that each of the elements described above, or two or more together, may also find a useful application in other types of brake systems differing from the types described above.

While the invention has been illustrated and described as embodied in the context of a method for the surveillance of a brake device in relation to load, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A method for the surveillance of a brake device relating to overload, where the brake device includes a wear readjustment device, is actuatable by a pressure p, and where the brake device reaches a load limit in a brake actuation, when a selected device component, which is deformed in a brake application, is warmed to a permissible temperature T, wherein
   (a) in a preliminary step the selected device component is warmed to said permissible temperature T,
   (b) in said preliminary step a characterizing curve of a value h measured versus pressure, is determined for the selected device component warmed to said temperature T, wherein the value h represents the deformation of the device component, said characterizing curve being designated as deformation characterizing curve $h = f_{(p,T)}$,
   (c) in a brake actuation, the value $h_{ist}$, representing a deformation occurring of the selected device component of the value h, and the existing pressure $p_{ist}$ are measured.
   (d) a warning signal is furnished if a point defined by the value $h_{ist}$ and the pressure $p_{ist}$ reaches the deformation characterizing curve $h = f_{(p,T)}$ or exceeds the deformation characterizing curve $h = f_{(p,T)}$ in a direction of higher values of the value h.

2. The method according to claim 1, wherein the brake device comprises a brake drum, and wherein the selected device component is the brake drum.

3. A method according to claim 1, employing
   a) a deformation sensor furnished for capturing the value $h_{ist}$ and for transforming the captured value into an electrical deformation signal,
   b) a pressure sensor furnished for capturing the existing pressure $p_{ist}$ and for transforming the captured value into an electrical pressure signal,
   c) an evaluation electronics furnished for receiving the deformation signal and the pressure signal,
   d) said deformation characterizing curve $h = f_{(p,T)}$ stored in the evaluation electronics,
   e) the evaluation electronics formed for comparing the value $h_{ist}$ with the value $h_{(pist,T)}$ of the deformation characterizing curve $h = f_{d(p,T)}$ coordinated to the existing pressure $p_{ist}$, and for furnishing the warning signal is the value $h_{ist}$ is equal to or larger than the value $h_{(pist,T)}$.

4. A method according to claim 3, further employing
   a) a time member for furnishing a measurement signal during a brake actuation at one or several predetermined points in time after the start of the brake actuation,
   b) the evaluation electronics structured for receiving the measurement signal and to become activated by said measurement signal.

5. An apparatus for the surveillance of a brake device relating to overload, wherein the brake device includes a wear readjustment device, wherein the brake device is actuatable by a pressure p, and wherein the brake device reaches a load limit in a brake actuation, when a selected device component, which is deformed in a brake application, is warmed to a permissible temperature T, wherein
   a) a deformation sensor is furnished for capturing the value $h_{ist}$ and for transforming the captured value into an electrical deformation signal,
   b) a pressure sensor is furnished for capturing the existing pressure $p_{ist}$ and for transforming the captured value into an electrical pressure signal,
   c) an evaluation electronics is furnished for receiving the deformation signal and the pressure signal,
   d) a deformation characterizing curve $h = f_{(p,T)}$ measured versus pressure is stored in the evaluation electronics,
   e) the evaluation electronics is formed for comparing the value $h_{ist}$ with the value $h_{(pist,T)}$ of the deformation characterizing curve $h = f_{(p,T)}$ coordinated to the existing pressure $p_{ist}$, and for furnishing a warning signal if the value $h_{ist}$ is equal to or larger than the value $h_{(pist,T)}$.

6. An apparatus according to claim 5 further comprising
   (a) a time member for delivering a measurement signal during a brake actuation at one or several predetermined points in time after the start of the brake actuation,
   (b) the evaluation electronics for receiving the measurement signal and to be activated by said measurement signal.

7. The method according to claim 5, wherein the selected device component is a brake drum.

8. An apparatus for the surveillance of a brake device relating to overload wherein the brake device includes a wear readjustment device comprising
   a selected device component for being subject to a deformation during a brake application;
   a deformation sensor engaging the selected device component for sensing a deformation value $h_{ist}$ of the selected device component and for delivering an electrical deformation signal corresponding to the value sensed;
   a pressure sensor for sensing an actual pressure $p_{ist}$ employed in brake actuation and for delivering an electrical pressure signal corresponding to the pressure value sensed;
   an evaluation electronics having a first input connected to the deformation sensor for receiving the electrical deformation signal, having a second input connected to the pressure sensor for receiving the electrical pressure signal and having an output, wherein said evaluation electronics incorporates a memory storage for storing a deformation characterizing curve $h = f_{(p,T)}$ representing deformation values measured versus pressure at a maximum permissible deformation temperature T, wherein said evaluation electronics further incorporates a means for comparing the value $h_{ist}$ with the value on the deformation characterizing curve $h = f(p,T)$ for the actual pressure $P_{ist}$, and wherein said output furnishes a warning signal if the value $h_{ist}$ is equal to or larger than said value $h_{(p,T)}$ on the deformation characterizing curve for $P_{ist}$.

9. The apparatus for the surveillance of a brake device according to claim 8 further comprising
the brake device actuatable by application of the pressure p to the brake device and exhibiting a load limit in connection with a brake actuation.

10. The apparatus for the surveillance of a brake device according to claim 8 further comprising
a time member subjectable to pressure in connection with an actuation of a brake and delivering a measurement signal during an actuation of the brake device at one or several predetermined points in time after the start of the brake actuation, and delivering the measurement signal to the evaluation electronics for activating the evaluation electronics with said measurement signal.

11. A method for the surveillance of a brake device relating to overload, wherein the brake device includes a wear readjustment device, and wherein the brake device is actuatable by a pressure p, and wherein the brake device reaches a load limit in a brake actuation determinable by a maximum permissible temperature T of a selected device component, comprising the steps:
warming the selected device component to the maximum permissible temperature T in a preliminary step;
measuring a deformation h of the selected device component at said maximum permissible temperature T in said preliminary step depending on application of a pressure p to said selected device component for obtaining a deformation characterizing curve $h=f(p,T)$ for said maximum permissible temperature T;
applying a pressure $p_{ist}$ during a brake actuation to the selected device component;
measuring a deformation value $h_{ist}$ representing a deformation experienced by the selected device component upon application of the pressure $p_{ist}$;
comparing the value $h_{ist}$ with the value on the curve $h=f(p,T)$ at $P_{ist}$;
delivering a warning signal if the value $h_{ist}$ is equal to or larger than said value on the curve $f(p,T)$ at $p_{ist}$.

12. The method for the surveillance of a brake device according to claim 10 further comprising
storing the deformation characterizing curve $h=f(p,T)$ in a memory storage of an evaluation electronics.

13. The method for the surveillance of a brake device according to claim 12 further comprising employing a deformation sensor for sensing the value $h_{ist}$ and for delivering a corresponding electrical deformation signal;
employing a pressure sensor for sensing the pressure $p_{ist}$ and for delivering a corresponding electrical pressure signal;
feeding the electrical deformation signal and the electrical pressure signal to the evaluation electronics, where the evaluation electronics compares the value $h_{ist}$ with the maximum permissible value $f(pist,T)$ and wherein the evaluation electronics initiates a generation of said warning signal if the value $h_{ist}$ is equal to or exceeds the value $f_{(pist,T)}$.

14. The method for the surveillance of a brake device according to claim 11 further comprising measuring a point in time of a brake actuation with a time member;
delivering a measurement signal by the time member to the evaluation electronics after elapsing of a certain time interval after the point in time of the brake actuation and thereby activating the evaluation electronics with the measurement signal.

15. The method for the surveillance of a brake device according to claim 11 further comprising
employing a brake drum as the selected device component.

* * * * *